Inventors
MAURICE ARCHAMBAULT
JAMES U. MACEWAN
CHARLES A. OLIVER
By *[signature]*
Attorney Inventors
MAURICE ARCHAMBAULT
JAMES U. MACEWAN
CHARLES A. OLIVER By Attorney United States Patent Office
3,017,243
Patented Jan. 16, 1962

3,017,243
METHOD OF PRODUCING LITHIUM CARBONATE FROM SPODUMENE
Maurice Archambault, Quebec, Quebec, James U. MacEwan, Montreal, Quebec, and Charles A. Olivier, St. Foy, Quebec, Canada, assignors to Department of Mines, Quebec, Quebec, Canada
Filed Aug. 11, 1958, Ser. No. 754,437
4 Claims. (Cl. 23—63)

This invention relates to the recovery of lithium salts from spodumene.

More specifically, the invention relates to the treatment of spodumene ores or concentrates in which the spodumene is associated with various alkali metal aluminum silicates.

For the better understanding of the invention it should be emphasized that spodumene is a lithium aluminum silicate ($Li_2O.Al_2O_3.4SiO_2$) and is a mineral of the pyroxene group found almost exclusively in pegmatite rocks. Besides lithium, spodumene always contains some isomorphous sodium. It is always or nearly always associated with alkali aluminum silicates and also with alkaline earth metal aluminum silicates. These latter two groups of silicates are minerals of the feldspar family (potassium, sodium and calcium-sodium feldspars) and of the feldspathoid family (nepheline and leucite). Spodumene ores generally contain less than 1.5% $Li_2O$, that is, less than 20% spodumene mineral. Grinding and concentration of spodumene ores involve expensive operations and the resulting concentrates carry at least small amounts of impurities.

Having regard to this problem, those working in this art have endeavoured to recover uncontaminated lithium sulphate from spodumene pegmatitic ores or from impure spodumene concentrates by various methods including leaching, chemical and physico-chemical extraction operations. Of these, ion exchange is important. For example, when lithium aluminum silicates are brought into contact with molten sodium or potassium sulphates an exchange of ions takes place. Sodium or potassium ions from the melt migrate into the silicate, replacing lithium ions combined therein. At the same time, lithium ions from the silicate migrate into the melt to yield lithium sulphate. The reaction is a pure exchange of ions, the alkali ions of the extracting salt simply are being exchanged for the lithium ions of the mineral.

In commercial and proposed processes using ion exchange techniques, one uses strong sulphuric acid and another ammonium sulphate to promote the desired exchange. These prior art processes, while operative, are not completely satisfactory. A main disadvantage is that they are costly resulting mainly from the high prices of the reacting agents and of the fuels for heating.

One of these processes now in commercial use is as follows. Alpha spodumene either in concentrates or ores is heated to about 1100° C. to convert the alpha to the beta form and is then cooled. This beta spodumene is mixed with strong sulphuric acid at natural ambient air temperatures. In this process an excess of sulphuric acid over the stoichiometric amount for the lithium present is used. The mixture is then heated to promote the reaction between the beta spodumene and the sulphuric acid following which, part of the excess sulphuric acid is volatilized. The preferred temperature for the reaction is from 220 to 250° C.

The acid forms, on the reacting surface of the beta spodumene particles, lithium bisulphate which has a melting point of not over 170° C. and which, therefore, is present as a liquid phase. The slowness of diffusion processes in liquid films retards attack of the unreacted spodumene in the core or unreacted part of the particles, and particles over 50 microns in size are not completely attacked in reasonable time. To offset this, a large excess of sulphuric acid is required.

This reaction is a liquid-solid reaction the liquid phases being the sulphuric acid and the lithium bisulphate and the solid phases being the unreacted spodumene, the hydrous aluminum silicate and the gangue impurities. After elimination of part of the excess acid by heating, the lithium sulphate is recovered by dissolving it in water and is treated by well-known methods for the production of required lithium salts of desired purities.

APPLICANTS' DEVELOPMENT

The applicants have now developed a process for recovering lithium salts from spodumene. This recovery is effected by a gas-solid thermal treatment using gaseous reactants which the applicants have found unexpectedly to act on the spodumene, while not reacting with the other constituents of the ores or concentrates, more specifically with minerals of the feldspar and feldspathoid families. This was unexpected since in some of the prior art processes, with gaseous reactants somewhat similar to those of the applicants, the attack of feldspar and leucite was claimed to be effected readily. Once more, it is shown that the chemical structure and the behaviour of one mineral do not give information by which one can predict the behaviour of another. For example, both alpha and beta spodumene have exactly the same chemical composition. However, the alpha form is extremely refractory to chemical processing while the beta form is quite reactive.

The applicants' process consists in a continuous exothermic and selective reaction between beta-spodumene and the gaseous reactants, in a gas-solid system, with no liquid phase present at any time during the reaction. Low cost gases are used with little excess. The reaction being exothermic, little or no extraneous heat is required.

The starting materials are spodumene ores or concentrates that are preferably crushed to minus 35 mesh (0.016 inch) and concentrated by flotation; however, the process has been satisfactorily applied to material as coarse as ¼ inch. The concentrates used contained from 4.5 to 7.5 percent $Li_2O$. Spodumene occurs in two crystalline modifications which are known as the alpha and beta forms. Alpha-spodumene is the form found in nature and has a density of 3.15 grams per cubic centimeter, and the beta form has a density of 2.4 grams per cubic centimeter. When the alpha-spodumene is heated to at least 870° C., it is converted to the beta form. The calculated increase in volume is 31 percent on conversion. When free alpha-spodumene particles are heated to above the transformation temperature they change from their dense form with a non-metallic lustre to a whiter and chalky form which is quite friable. This chalky porous material is very readily penetrated by gases but not by liquids. When locked spodumene particles are transformed, they are restrained from expanding freely but tend to fracture the surrounding gangue minerals thus giving minute fissures readily penetrated by gases.

Differential thermal analysis and X-ray studies have shown the applicants that it is not necessary to heat the spodumene to above 1000° C. according to usual practice and thus the spodumene concentrates and ores remain below the incipient fusion temperature of the gangue minerals. For example, minus 35 mesh spodumene concentrates are converted to the beta form in a short time after being brought to temperatures above about 875° C. A period of a few minutes at these temperatures is usually adequate to convert the coarser particles and a much shorter time for the finer particles.

The applicants' method of reaction being of the gas-solid type it was found unnecessary to have concentrates much finer than about minus 35 mesh (0.016 inch) which is an advantage over other processes using a liquid-solid type of reaction; in the case of these processes the rate and completion of reaction are much more limited by the size of particles.

According to the applicants' process, there are brought into contact in the sulphating reactor beta-spodumene (preferably while it is still hot from its decrepitation treatment) and a hot gaseous mixture of water vapour, air and sulphur trioxide under conditions effective to maintain a true gaseous phase, i.e., without producing a fog or mist.

The sulphur trioxide may be from any source, for example, it may be fed as such, or it may be formed by passing sulphur dioxide (obtained for example, from the combustion of sulphur or metal sulfides) and air over a catalyst under conditions to convert these gases to or near the equilibrium concentration of sulphur trioxide. It is recommended that the maximum ratio of sulphur dioxide to free oxygen in the gas mixture be 2 to 1 by volume.

To the hot mixture of gases, obtained in the sulphur trioxide converter, water (atomized or vapourized) is added to supply $H_2O$ for the reaction and to prevent the exothermic sulphating reaction from generating enough heat to hinder its own progress and this new mixture is brought into contact with the hot beta spodumene. The minimum amount of water must be at least 105% of the stoichiometric amount of $Li_2O$ present. The temperature in the reaction zone at the time of contact should be within the range from about 335° C. to about 450° C., preferably from about 350° C. to about 425° C.

It is also possible to form sulphur trioxide by dissociation of sulphuric acid through heating above about 335° C. (or between about 335° C. and 450° C.):

$$H_2SO_4 + 21,300 \text{ calories} \rightarrow H_2O + SO_3$$
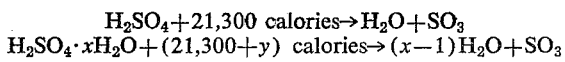

This would permit the use of sulphuric acid waste liquor or "spent acid" for the applicants' reaction.

The hot gas mixture and the hot beta-spodumene material are fed continuously into a partially closed reaction zone which can be, for example, a rotary kiln or a multi-hearth furnace in which the gaseous mixture is continuously passed through and countercurrently to the solids so that the material which has been exposed to the gases for the longest time meets strong fresh gases, while the nearly exhausted gases are brought into contact with fresh beta-spodumene. In this way, on the one hand, the lithium of the spodumene is completely converted into sulphate and, on the other hand, the reacting gases are nearly fully utilized. The treatment is carried on usually for a time within the range from about 10 to about 40 minutes depending on the degree of agitation of the reactants. This results in a selective reaction through which the lithium oxide content of the beta spodumene is replaced by an equivalent amount of water, and in the preferential formation of water-soluble lithium sulphate and of a new substance having the chemical composition of pyrophyllite

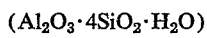

The products of the above gaseous treatment are countercurrently leached with water to dissolve the lithium sulphate.

The total amount of sulphur trioxide used in the process must be equal at least to the stoichiometric amount required for the lithium oxide present. An excess of 5 to 15% is recommended. Any amount of sulphur gases beyond the amount required for complete reaction is unnecessary and represents an economic loss. Yields of 97% in water-soluble lithium sulphate have been obtained in a contact time of less than 15 minutes with an excess of only 10% sulphur trioxide. The applicants have discovered that the concentration of sulphur trioxide must also be maintained low enough by dilution with air or inert gas for example, nitrogen, so that, at the temperatures used, the formation of lithium bisulphate is prevented. To obtain this, the applicants have found that the amount of air or inert gas is generally within the range from about 5 to about 20 times the volume of sulphur trioxide for rotary kiln operation. For static bed operation, the sulphur trioxide dilution required may be up to 200 times. Actually, there is no upper figure for the amount of water fed with the exception that it may become uneconomical to exceed the amounts prescribed in the specification. As indicated, water is used not only for the purpose of chemical combination but also for cooling where necessary.

While it is known that prolonged contact time between strong sulphuric acid and beta-spodumene results in a cation exchange reaction, wherein the hydrogen ion of the sulphuric acid is substituted for the lithium ion of the spodumene, it is quite unexpected to find that a short contact time between a gaseous mixture of sulphur trioxide and water vapour brings about an equivalent substitution, since exchange of ions is likely to occur only on bringing a solid in contact with an electrolyte.

In both the sulphuric acid process and the ammonium sulphate process, the reaction proceeds through ionization of the liquid reactants into electrically charged ions, in contradistinction with the applicants' process where the reaction proceeds through the gaseous reactants: sulphur trioxide and water vapour.

At the reaction temperatures and dilutions used, the water vapour and sulphur trioxide remain essentially uncombined. For instance, at 350° C., when the sulphur trioxide and water vapour contents of the gaseous mixture are both 1% in volume, it can be calculated (Bodenstein and Katayama, Z. Elektrochimie, 15, 244, 1919) that 97% of the sulphur exists as sulphur trioxide and only 3% of it as gaseous sulphuric acid. The concentration of sulphuric acid gas in the gaseous mixture is thus only 0.03% by volume. At temperatures higher than 350° C. the concentration of sulphuric acid gas will be still lower.

In no circumstances with the applicants' process, is the sulphuric acid gas content of the gaseous reacting mixture above 5% by volume; it is generally from about 0.5% to about 2.5% by volume. When considering prior art processes such as the strong sulphuric acid process, it becomes evident that the mechanism of the reaction is different from that of the applicants' process, since with the strong sulphuric acid process, the rate of attack decreases with the decreasing concentration of the acid, in contradistinction with the applicants' process where the rate of attack does not decrease with the dilution of the sulphuric acid incidentally present in the gaseous reacting mixture.

It is also an unexpected discovery that the applicants' process works better with gaseous reacting mixtures in which the concentration of sulphur trioxide is low.

With the liquid sulphuric acid process, operating within the range of 200° C. to 500° C., the liquid sulphuric acid is much more effective below about 300° C. With the applicants' process using a gaseous mixture of sulphur trioxide and water vapour the opposite is unexpectedly true, the optimum temperature of reaction being from about 350° C. to about 425° C.

In the applicants' process, the reaction produces lithium sulphate directly from the spodumene, as opposed to the strong sulphuric acid process, where the product formed is lithium bisulphate, which subsequently is partly decomposed by additional heating, yielding a mixture of lithium sulphate and lithium bisulphate.

An integrated commercial process for the treatment of spodumene in ores and concentrates for lithium recovery using the applicants' invention can be modified in some details to give the most economical operation for any given locality and set of conditions. These variables that affect the cost of the plant and its operating charges include available fuels, sources of sulphur dioxide, lithium salts desired and geographical location. Four of these plant arrangements are given in detail as follows, it being understood it is not the intention of the applicants necessarily to limit the use of the process to these procedures:

Figure 1:
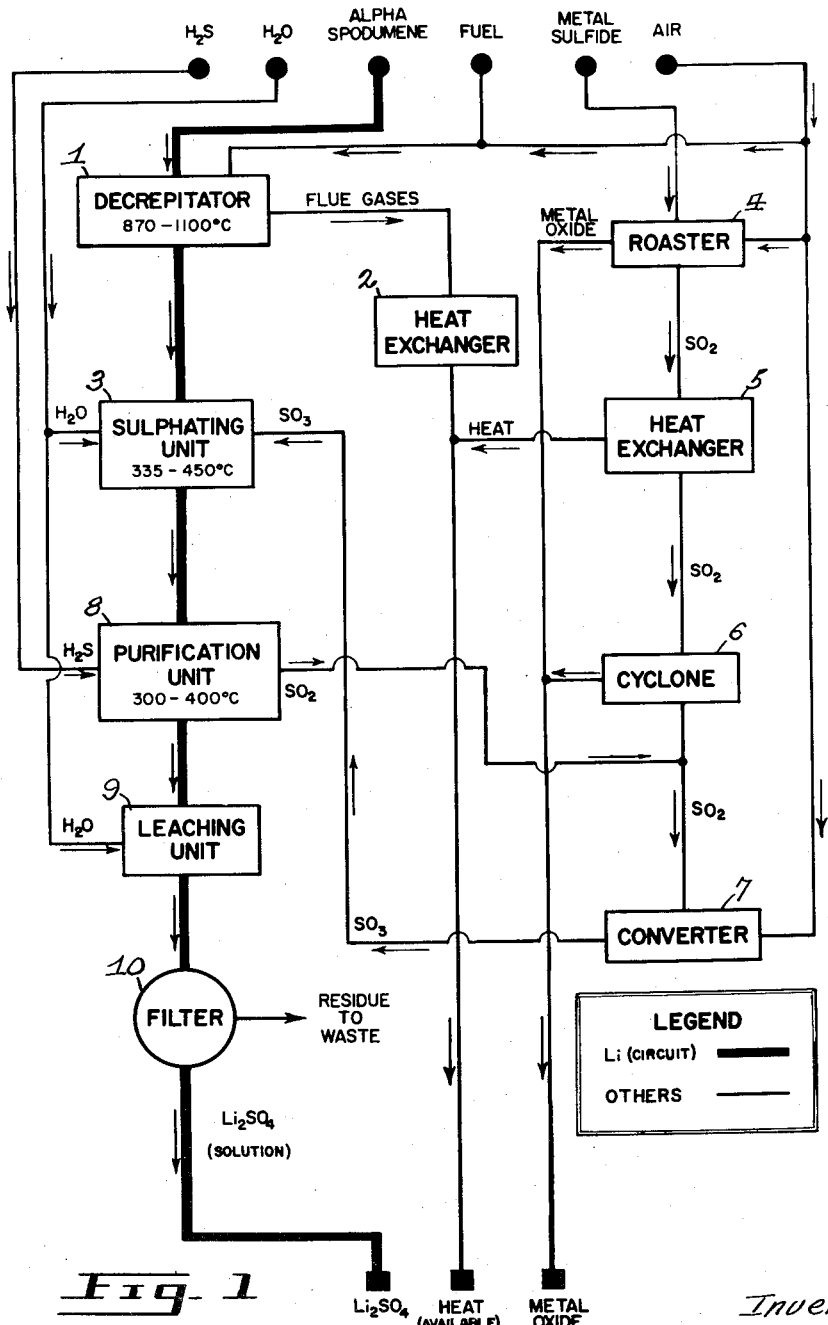
FIGURE 1 is a flow-diagram showing a treatment to give lithium sulphate in aqueous solution including purification of the sulphated spodumene.

*FIGURE 1.*—Referring now to FIGURE 1, spodumene, preferably in the form of concentrates, is heated to above 870° C. in a muffle furnace or a fluidized bed reactor (decrepitator 1) to convert the alpha-spodumene to beta-spodumene or to cause as it is called decrepitation of spodumene. The hot gases from the decrepitation step are used through heat exchanger 2 for heating purposes throughout the plant. The beta-spodumene is then cooled to about 350° C. and fed to a reactor (sulphating unit 3), for instance, a multi-hearth furnace or a rotary kiln.

In an appropriate burner (roaster 4), sulphur dioxide is formed by the oxidizing roast of metal sulphides such as pyrite, and the resulting gases, after passing through heat exchanger 5, are cleaned by cyclones 6. The sulphur dioxide-bearing gases are then passed with the proper amount of additional air through a catalytic chamber or converter 7 to give the best possible transformation of sulphur dioxide to sulphur trioxide. The dilute sulphur trioxide gas mixture is then fed countercurrently to the reactor 3, with added steam or water in the form of a mist or spray in amount to enter into the chemical reaction with the beta-spodumene and also an additional amount of water spray, when necessary, to control the temperature in the reaction zone of the sulphating unit 3. The product of the reaction is a dry material which contains lithium sulphate, a little sodium sulphate (from isomorphous sodium of the spodumene), small amounts of metal sulphates such as aluminum and iron sulphates and an insoluble residue. This mixture, on discharging from the reactor 3 and while still hot, is treated with hydrogen sulphide gas or elemental sulphur in a purification unit 8 to convert the sulphates of aluminum and iron to water-insoluble compounds. The solid product is then leached countercurrently with water (cf. leaching unit 9) and filtered (filter 10) and the lithium sulphate is recovered from the solution by known means to give a marketable product or an intermediary that can be converted to other salts of lithium.

Although the cost of sulphur dioxide and other materials used in the process is low, it is possible to change the above operation to cyclic modifications that offer extra definite economies. Further, the lithium can be recovered as lithium carbonate, an easily marketed product. Such cyclic modifications are given in details below.

*FIGURE 2.*—Referring, for example to FIGURE 2, the spodumene is similarly treated as in the process of FIGURE 1 to convert it from the alpha to the beta form with the hot gases from the decrepitation unit being used as a source of heat in the plant (cf. steps 1 and 2) and the carbon dioxide of the gases used in a carbonating step 18 to be described later.

The beta-spodumene is treated as described before with dilute sulphur trioxide-bearing gases and added water at about 350° C. in the sulphating unit 3. The dry product from the reactor is countercurrently leached (leaching unit 9) with the required amount of water containing sufficient sodium carbonate (by-product of the process, cf. step 18) to attain a pH of about 6 to about 7 under which condition all aluminum and iron impurities precipitate as insoluble compounds. The slurry is then discharged to a filter 10 which gives a concentrated solution containing only lithium sulphate with a little sodium sulfate and an insoluble residue.

To this clarified solution is added a sufficient quantity of sodium carbonate concentrated solution to precipitate the lithium ions as lithium carbonate (cf. precipitating unit 14). This lithium carbonate is recovered by filtration (filter 15) or centrifuging and then dried. This is a marketable product but it may be further processed if desired.

The solution from the lithium carbonate precipitation step 14 contains sodium sulphate and a little unprecipitated lithium carbonate. This solution is evaporated to dryness as for example in a spray dryer (evaporator 16). The dried salts are then treated with reducing agents at from about 700° C. to about 1100° C. to convert the sodium sulphate to sodium sulphide (cf. sulphidizing unit 17). The mixture of sodium sulphide and lithium carbonate is formed into a slurry with a suitable quantity of water, and carbon dioxide is passed in the slurry which is maintained preferably between about 60° and about 95° C. (cf. carbonating unit 18). A suitable source of carbon dioxide is, for example, the products of combustion of the fuel used in the decrepitator 1 after passing through a heat exchanger 2. The addition of carbon dioxide to the slurry converts the sodium sulphide to sodium carbonate and causes the evolution of hydrogen sulphide gas. The solution now contains a high concentration of sodium carbonate and a minor amount of lithium carbonate; it is used to neutralize the leach liquor and to precipitate further quantities of the lithium carbonate from the lithium sulphate solution. By this means, the lithium carbonate not recovered in the first precipitation step 14 is returned to the circuit and so never lost. The hydrogen sulphide evolved in the carbonation step 18 is oxidized to produce sulphur which is burnt to sulphur dioxide for reuse in the process (cf. steps 11, 12, 13, 7 and 3).

Make up reactants are added, when necessary, to compensate for losses normal to any cyclic operation.

Figure 2:
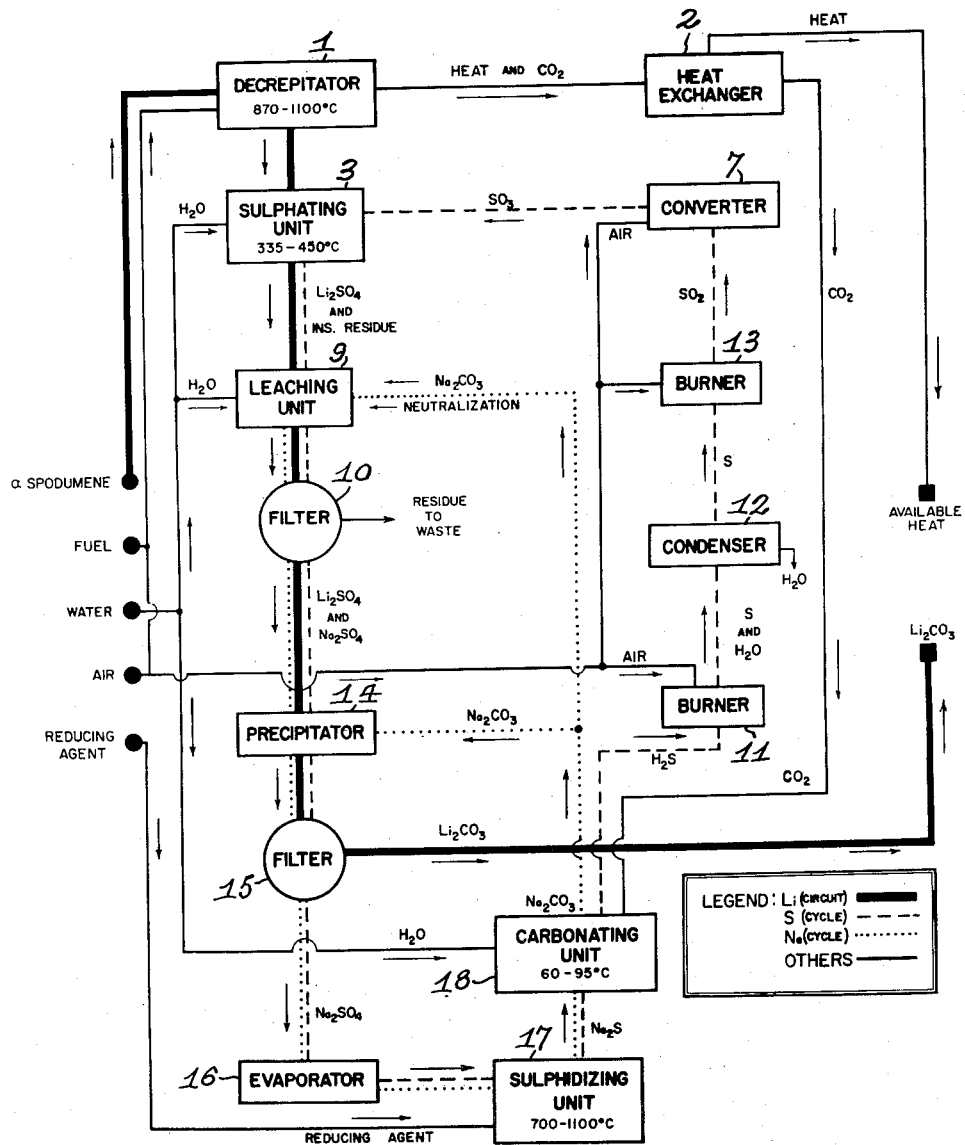
FIGURE 2 is a flow-diagram showing a cyclic treatment for the direct recovery of marketable lithium carbonate.
Figure 3:
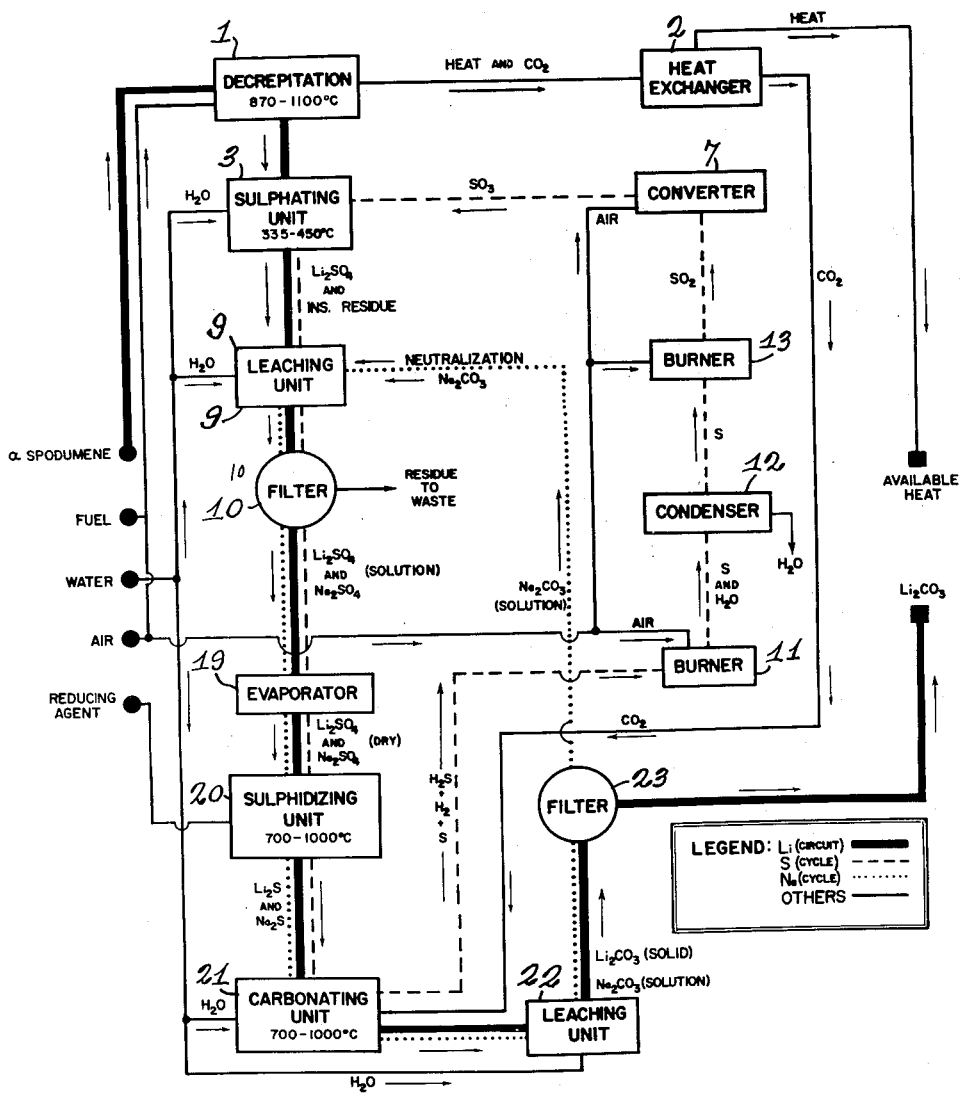
FIGURE 3 is a flow-diagram showing a cyclic process to recover lithium in the form of lithium sulphide and its subsequent conversion to lithium carbonate.

*FIGURE 3.*—Referring now to FIGURE 3, the spodumene is similarily treated as in the process of FIGURE 2, and a clarified solution of lithium and sodium sulfates free from aluminum and iron salts is produced as described; the leaching step 9 is conducted by known means to obtain preferentially a solution as high in lithium sulphate as possible (cf. steps 1, 2, 3, 9 and 10.)

This clarified concentrated solution is evaporated as for example in a spray drier (evaporator 19). The dried salts which are strictly lithium and sodium sulphates are reduced by suitable agents and economic means to their corresponding sulphides at temperatures between about 700° C. to about 1000° C. (cf. sulphidizing unit 20). The sulphides are reacted within the same range of temperatures as above with carbon dioxide and water vapour to give a mixture of lithium and sodium carbonates and at the same time evolve a gaseous mixture of hydrogen sulphide, sulfur and hydrogen (cf. carbonating unit 21).

The hot mixture of carbonates is quenched with sufficient water and agitated to dissolve preferentially the sodium carbonate (cf. leaching unit 22). Solid lithium carbonate is recovered by centrifuging and is of good grade (cf. filter 23). The solution of sodium carbonate with very little dissolved lithium carbonate is returned to the process to neutralize the first leach solution (cf. leaching unit 9). Any dissolved lithium carbonate is therefore recirculated in the process and subsequently recovered.

The evolved gaseous mixture of hydrogen sulphide, sulphur and hydrogen is burnt to give sulphur dioxide which returns to the process as the sulphating agent (cf. steps 11, 12, 13 and 7).

Figure 4:
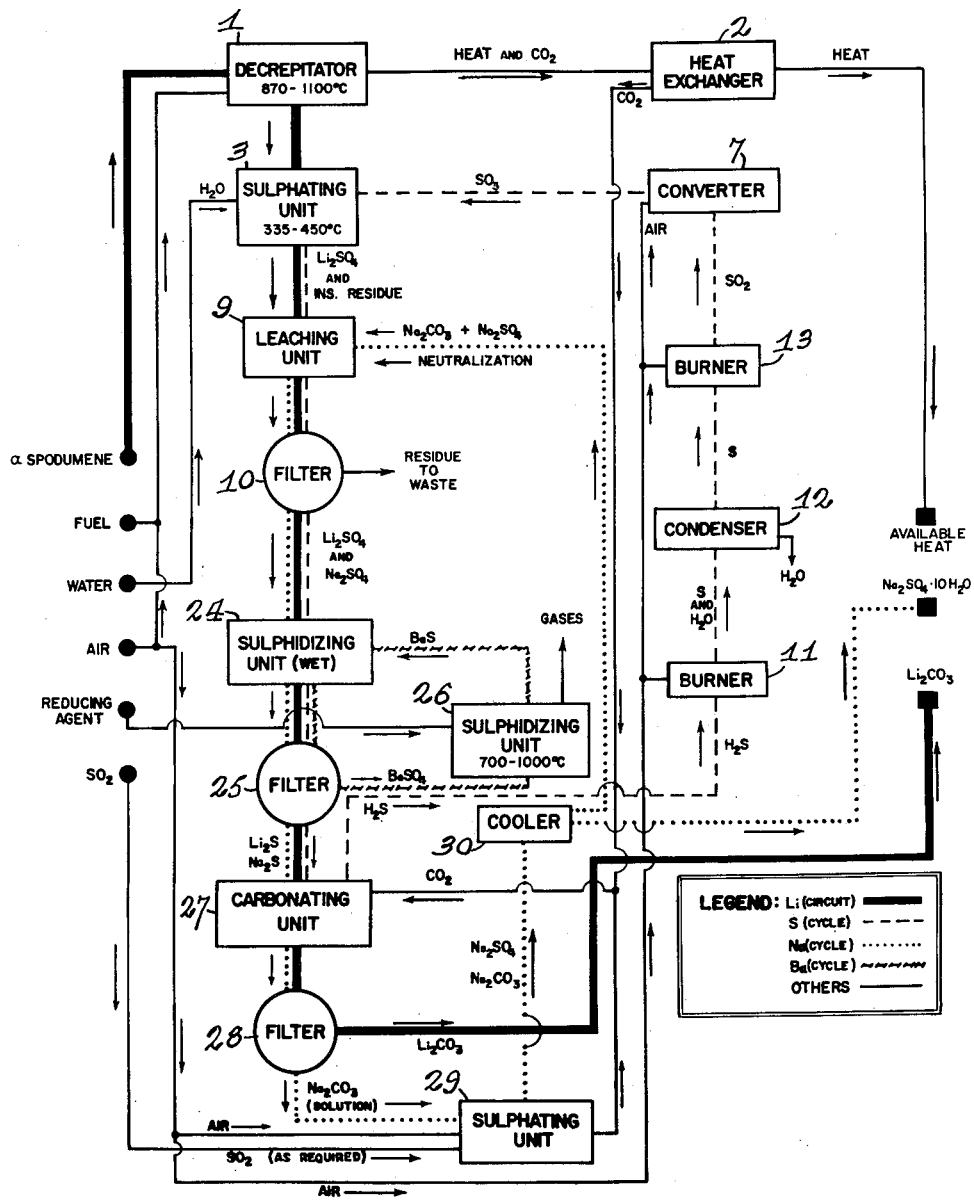
FIGURE 4 is a flow-diagram showing a cyclic process for the recovery of lithium carbonate through the use of barium sulphide.

*FIGURE 4.*—Now referring to FIGURE 4, the spodumene treated, as in the modifications of FIGURES 2 and 3 (cf. steps 1, 2 and 3), is leached with a solution described below so as to obtain a neutral concentrated solution of lithium sulphate (cf. leaching unit 9). The solution from filter 10, preferably when hot, is treated with barium sulphide to precipitate barium sulphate leaving a solution of lithium sulphide (cf. sulphidizing unit 24). After centrifuging or filtration (filter 25), the barium sulphate is sulphidized in a conventional manner to regenerate the barium sulphide (cf. sulphidizing unit 26), whereas the solution of lithium sulphide heated preferably between about 60° and about 95° C. is treated in carbonating unit 27 with enough carbon dioxide: (*a*) to precipitate lithium carbonate which is removed through filter 28; and (*b*) to regenerate hydrogen sulphide, which is further processed in a conventional manner into sulphur trioxide (cf. steps 11, 12, 13 and 7) which reacts (cf. sulphating unit 3) with more spodumene.

The solution from carbonating step 27 contains mostly sodium carbonate and a little lithium carbonate. It is treated with a certain amount of sulphur dioxide and air so that part of the sodium carbonate is transformed into sodium sulphate (cf. sulphating unit 29). The amount of sulphur dioxide and air are calculated so that when this solution is used later on (cf. leaching unit 9) as the leach solution to dissolve additional lithium sulphate from the sulphating step 3, it contains sufficient sodium carbonate so as to obtain a neutral final leach liquor, thus preventing the dissolution of any iron and aluminum salts. After the partial conversion of sodium carbonate into sodium sulphate, the solution is cooled (cooler 30) to about 0° C. in order to crystallize and remove most of the sodium sulphate in a hydrated form. The solution, which now contains mostly sodium carbonate, is used to leach the product from sulphating step 3.

REACTIONS INVOLVED

The primary reaction involved in the applicants' process is believed to be:

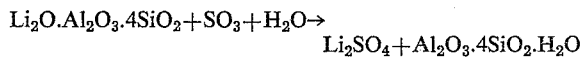

$$Li_2O \cdot Al_2O_3 \cdot 4SiO_2 + SO_3 + H_2O \rightarrow Li_2SO_4 + Al_2O_3 \cdot 4SiO_2 \cdot H_2O$$

The spodumene is broken down to water-soluble lithium sulphate and an insoluble residue. The chemical composition of this residue coincides with that of pyrophyllite ($Al_2O_3 \cdot 4SiO_2 \cdot H_2O$). One can follow the progress of the reaction and determine its completion by noting that the X-ray diffraction pattern of beta-spodumene grows fainter and fainter as the reaction progresses, while a new pattern appears, which could not be found in the literature. The end of the reaction is indicated by the complete disappearance of the pattern of beta-spodumene.

Other reactions involved are as follows:

(*a*) Precipitation of lithium carbonate:

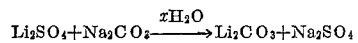

$$Li_2SO_4 + Na_2CO_3 \xrightarrow{xH_2O} Li_2CO_3 + Na_2SO_4$$

(*b*) Sulphide formations:

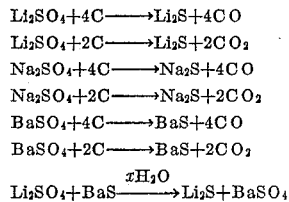

$$Li_2SO_4 + 4C \longrightarrow Li_2S + 4CO$$
$$Li_2SO_4 + 2C \longrightarrow Li_2S + 2CO_2$$
$$Na_2SO_4 + 4C \longrightarrow Na_2S + 4CO$$
$$Na_2SO_4 + 2C \longrightarrow Na_2S + 2CO_2$$
$$BaSO_4 + 4C \longrightarrow BaS + 4CO$$
$$BaSO_4 + 2C \longrightarrow BaS + 2CO_2$$
$$Li_2SO_4 + BaS \xrightarrow{xH_2O} Li_2S + BaSO_4$$

(*c*) Carbonate formations:

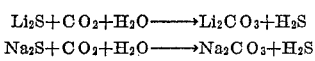

$$Li_2S + CO_2 + H_2O \longrightarrow Li_2CO_3 + H_2S$$
$$Na_2S + CO_2 + H_2O \longrightarrow Na_2CO_3 + H_2S$$

(*d*) Wet sulphation:

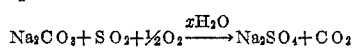

$$Na_2CO_3 + SO_2 + \tfrac{1}{2}O_2 \xrightarrow{xH_2O} Na_2SO_4 + CO_2$$

(*e*) Roasting of pyrite:

$$4FeS_2 + 11O_2 \longrightarrow 2Fe_2O_3 + 8SO_2 + 79{,}000 \text{ calories}$$

(*f*) Oxidations of hydrogen sulfide:

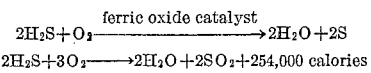

$$2H_2S + O_2 \xrightarrow{\text{ferric oxide catalyst}} 2H_2O + 2S$$
$$2H_2S + 3O_2 \longrightarrow 2H_2O + 2SO_2 + 254{,}000 \text{ calories}$$

(*g*) Burning of sulphur:

$$S + O_2 \rightarrow SO_2 + 69{,}000 \text{ calories}$$

(*h*) Conversion of sulphur dioxide into sulphur trioxide:

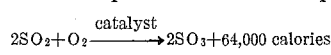

$$2SO_2 + O_2 \xrightarrow{\text{catalyst}} 2SO_3 + 64{,}000 \text{ calories}$$

(*i*) Purification of the sulphated spodumene:

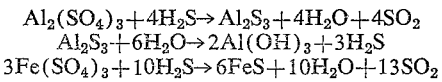

$$Al_2(SO_4)_3 + 4H_2S \rightarrow Al_2S_3 + 4H_2O + 4SO_2$$
$$Al_2S_3 + 6H_2O \rightarrow 2Al(OH)_3 + 3H_2S$$
$$3Fe(SO_4)_3 + 10H_2S \rightarrow 6FeS + 10H_2O + 13SO_2$$

Characteristics of the invention are as follows:

The process is based on a preferential action upon spodumene, with little or no attack of the associated gangue minerals, usually feldspar and sometimes feldspathoid. This is contrary to what could be expected from the prior art processes which claim to convert the feldspar and feldspathoid (sodium and potassium aluminum silicates) to the corresponding sulphates, by heating them with sulphur dioxide, sulphur trioxide and water.

Reactions with feldspars were tried in the same conditions as used for successful reaction with beta-spodumene, but the applicants' method failed to render soluble their sodium or potassium contents. The applicants' process under similar conditions, was repeated upon the feldspathoid leucite, and although this mineral is known to be much less acid-resistant than feldspars, no more than a 7% extraction was obtained.

The present invention permits a high recovery of lithium as sulphate, recoveries of over 99% not being uncommon because of the particular properties of the gas phase. The reacting gases penetrate the most tiny, deep and numerous cracks produced into the spodumene during the decrepitation; there is a free exchange of the reacting gases with those that filled the cracks during the decrepitation process.

On the contrary, when the reactants are in the liquid phase as is the case with strong sulphuric acid and lithium bisulphate (melting around 170° C.) the liquid phases, because of their viscosity cannot readily penetrate the numerous, tiny and deep cracks in the spodumene particles.

The invention provides a rapid reaction of the gaseous mixture with the spodumene for the same reasons as set forth previously.

The invention employs an exothermic reaction with the spodumene to such an extent that no heat is required in the reaction zone, once the reaction has been initiated.

The invention makes possible the treating of large particle size spodumene because of the very high diffusivity of the gas phase through the particles as compared to that of a liquid phase as previously explained.

The invention makes possible the primary or direct recovery of very low-acidity lithium sulphate.

In the present process the lithium sulphate is recovered practically free from elements other than alkali metals.

The present process provides for a very high lithium extraction when using an amount of sulphur trioxide in excess of not more than about 15% over the stoichiometric amount required to form normal lithium sulphate.

The invention can use cyclic arrangements through regeneration of the reactants.

The process of the invention is most economical, since the starting materials are exceptionally of low cost and because their exothermic values are high.

Indeed sulphur dioxide may be obtained industrially by roasting sulphur or metal sulphides such as pyrites; the roasting of sulphur or sulphides has two advantages; first, the roasting liberates heat which can be utilized in the process for heating and evaporating solutions, and second, provides dilute sulphur dioxide containing gas. This dilute gas containing sulphur dioxide is diluted again with excess air in order to be converted to sulphur trioxide in good yield; this transformation also generates useful heat.

EXAMPLES

The following examples were based on the use of comminuted beta-spodumene, including those for the reactions upon spodumene with sulphuric acid and acid ammonium sulphate. Excess of reagents was always calculated on the amount of lithium present in the sample. Decrepitation was always complete, this factor being controlled by X-ray diffraction analysis and confirmed by special chemical extraction. Many recoveries of 100% were obtained, indicating that the decrepitation was complete, since alpha-spodumene does not react except when very finely divided.

*Example I*

HIGH DILUTION OF GAS PHASE

One hundred (100) parts of a spodumene concentrate, previously decrepitated, of good grade (analyzing 6.1% lithium oxide) were treated in a static bed in an electrically heated tube furnace for 30 minutes under a stream of gases, the total amounts of which were 44 parts by weight of sulphur dioxide, 52 parts of air saturated with water at 50° C. and 78 parts of dried air. The mixture of gases was first passed over a platinized asbestos catalyst at 450° C.; the temperature of the spodumene and of the gases in the reaction zone was held at 350° C.

After cooling, the product was leach with distilled water and analyzed for soluble and insoluble lithium oxide. The recovery of lithium sulphate was 98.2%.

*Example II*

HIGH RECOVERY

One hundred (100) parts of a beta-spodumene concentrate, analyzing 6.4 percent of $Li_2O$ were treated in stationary bed in a tube furnace for twenty (20) minutes under a stream of gases, the total amounts of which were 170 parts by weight of sulphur dioxide bubbled through water and 755 parts of air. The mixture of gases was passed over a platinized asbestos catalyst at 450° C., the temperature of the spodumene and of the gases in the reaction zone was held at 350° C.

After cooling, the recovery of lithium sulphate was over 99.7 percent.

*Example III*

CONTINUOUS OPERATION—ROTARY KILN—LOW EXCESS

In a 6 inch inside diameter rotary kiln, 25 pounds per hour of beta-spodumene concentrate previously heated to 350° C. were passed countercurrently to a mixture of gases formed by passing through a vanadium oxide catalyst at 450° C. a mixture of 0.25 standard cubic foot per minute of dried sulphur dioxide and 0.95 standard cubic foot per minute of dried air, then adding to the catalytically activated gases 0.27 standard cubic foot per minute of water vapor. The temperature at the discharge end and in the center of the reaction zone were respectively 370° C. and 390° C. without additional heating. In other words, the material to be treated being hot, the heat of reaction was sufficient to maintain the proper range of temperature at the site of the reaction.

This experiment gave yields of 97% of water-soluble lithium sulphate. Sulphur trioxide was in excess of 15% over the theoretical. The slope of the rotary kiln was so arranged that the material passed through the reaction zone in about 12 minutes. The amount of water vapor was approximately stoichiometric.

*Example IV*

PURIFICATION

A sample of sulphated spodumene concentrate prepared by the process of the invention containing 1% water-soluble alumina and by intention a high amount (6%) of sulphuric acid, was heated at 350° C. in hydrogen sulphide for 30 minutes. After the reaction the soluble alumina content was only 0.11%, a relative decrease of 89% of the original figure, and the sulphuric acid was only 0.17%, a relative decrease of 97% of the original figure.

PRIOR ART

*Example A*

SULPHURIC ACID PROCESS

Beta-spodumene, 100 parts, containing 6.1% of lithium oxide was treated in an electrically heated tube furnace for 30 minutes at 350° C. with 27 parts of 82% sulphuric acid (25% excess). After cooling, the product was leached with water and analyzed for lithium.

Recovery of lithium sulphate was 73%.

*Example B*

AMMONIUM SULPHATE PROCESS

Beta-spodumene concentrate, 100 parts, containing 6.35% lithium oxide was mixed with 200 parts of acid-ammonium sulphate (excess of 800%) and treated in an electrically heated tube furnace for 30 minutes at 320° C. After cooling and leaching the recovery of lithium was 94.2%.

This application is a continuation-in-part application of United States patent application S.N. 608,560, filed September 7, 1956, now Patent No. 2,923,600.

We claim:

1. An integrated cyclic process for recovering lithium carbonate from spodumene, which comprises: heating comminuted material selected from the group consisting of spodumene ores and concentrates above decrepitation temperature but below sintering temperature of the normal components of the material and recovering excess heat; reacting the decrepitated spodumene with a gaseous mixture of sulphur trioxide, water vapour and air, at temperatures between about 335° C. and about 450° C., thus producing a mixture of water-soluble lithium sulphate with a minor amount of sodium sulphate from isomorphous sodium and an insoluble residue of hydrated aluminum silicate substantially free from available lithium; leaching and purifying said lithium sulphate with water containing enough sodium carbonate from a subsequent step of the process to precipitate contaminating impurities and to obtain a concentrated solution of lithium sulphate with some sodium sulphate and an insoluble residue containing said contaminating impurities; separating the lithium sulphate-containing solution from the insoluble residue; precipitating lithium carbonate by reacting the lithium sulphate solution with sodium carbonate from a subsequent step of the process; separating the precipitated lithium carbonate from the resulting solution; evaporating to dryness the separated solution which contains sodium sulphate; converting the dry sodium sulphate thus obtained into sodium sulphide by heating it in the presence of a reducing agent at a temperature between about 700° C. and 1100° C. while providing available excess heat and combustible gases; transforming the sodium sulphide into sodium carbonate by reacting it with carbon dioxide and water at a temperature from about 60° C. to about 95° C. and simultaneously evolving hydrogen sulphide; recovering the hydrogen sulphide thus evolved and processing it to sulphur dioxide, then to sulphur trioxide and providing available excess heat; recycling the sulphur trioxide so derived to the reaction with the spodumene, and recovering the sodium carbonate and employing it to purify further lithium sulphate leach solution and to precipitate further lithium carbonate from the purified lithium sulphate leach solution.

2. An integrated cyclic process for recovering lithium carbonate from spodumene, which comprises: heating a comminuted material selected from the group consisting of spodumene ores and concentrates above decrepitation temperature of spodumene but below sintering temperature of the normal components of the material and recovering excess heat; reacting the decrepitated spodumene with a gaseous mixture of sulphur trioxide, water vapour and air, at temperatures between about 335° C., and about 450° C., thus producing a mixture of water-soluble lithium sulphate with a minor amount of sodium sulphate from isomorphous sodium and an insoluble residue of hydrated aluminum silicate substantially free from available lithium; leaching and purifying said lithium sulphate with water containing enough sodium carbonate from a subsequent step of the process to precipitate contaminating impurities and to obtain a concentrated solution of lithium sulphate with some sodium sulphate and an insoluble residue containing said precipitated impurities; separating the lithium sulphate-containing solution from the insoluble residue; evaporating the solution to dryness; reacting the so-obtained lithium and sodium sulphates with reducing agents at a temperature from about 700° C. to about 1000° C. to produce lithium and sodium sulphides while providing available excess heat and combustible gases; transforming these sulphides into lithium and sodium carbonates by reacting them with carbon dioxide and water vapour at a temperature between about 700° C. and about 1000° C. while providing available excess heat and evolving hydrogen sulphide containing combustible gases; recovering said hydrogen sulphide-containing gases and their heat value and available heat content for return to the process; leaching the mixture of lithium carbonate and sodium carbonate with substantially the minimum amount of water to dissolve preferentially the sodium carbonate, leaving a residue of lithium carbonate; separating the lithium carbonate and recycling the sodium carbonate solution to the step of purifying the lithium sulphate leach solution.

3. An integrated cyclic process for recovering lithium carbonate from spodumene, which comprises: heating a comminuted material selected from the group consisting of spodumene ores and concentrates above decrepitation temperature but below sintering temperature of the normal components of the material and recovering excess heat; reacting the decrepitated spodumene with a gaseous mixture of sulphur trioxide, water vapour and air, at temperatures between about 335° C. and about 450° C., thus producing a mixture of water-soluble lithium sulphate with a minor amount of sodium sulphate and an insoluble residue of hydrated aluminum silicate; leaching and purifying said lithium sulphate with water containing enough sodium carbonate and sodium sulphate from a subsequent step of the process to precipitate contaminating impurities and to obtain a concentrated solution of lithium sulphate with some sodium sulphate and an insoluble residue containing said precipitated impurities; separating the lithium sulphate-containing solution from the insoluble residue; reacting the lithium and sodium sulphate solution with barium sulphide thus forming a solution of lithium and sodium sulphides together with a precipitate of barium sulphate; separating out the barium sulphate from the solution, and subsequently treating said barium sulphate with reducing agents at a temperature between about 700° C. and about 1000° C. so as to cause its conversion to barium sulphide and the evolution of combustible gases to regenerate barium sulphide; recycling said barium sulphide to react with further lithium and sodium sulphate solution; heating the lithium and sodium sulphide solution at a temperature between about 60° C. and about 95° C. and passing through it carbon dioxide gas thus causing the evolution of hydrogen sulphide gas; burning said hydrogen sulphide gas and returning it to the process while producing available excess heat; separating out and recovering the precipitated lithium carbonate; bubbling through the sodium carbonate solution sulphur dioxide and air in such quantities that part of its carbonate is transformed into solium sulphate leaving some sodium carbonate, recycling said sodium carbonate to the step of purifying the lithium sulphate; cooling said sodium sulphate concentrated solution to crystallize out and separate most of the sodium sulphate as decahydrated salt.

4. A process, as defined in claim 2, wherein the comminuted material and the gaseous sulphating mixture are brought to about 335° C. to about 450° C., prior to their introduction into the reaction zone of the sulphating vessel where the temperature is held between about 335° C. and about 450° C.

References Cited in the file of this patent

UNITED STATES PATENTS

| | | |
|---|---|---|
| 692,008 | Frolich | Jan. 28, 1902 |
| 1,315,761 | Coolbaugh | Sept. 9, 1919 |
| 2,036,015 | Broderick et al. | Mar. 31, 1936 |
| 2,516,109 | Ellestad et al. | July 25, 1950 |
| 2,801,153 | Dwyer | July 30, 1957 |